US 6,636,463 B2

(12) United States Patent
Kwon et al.

(10) Patent No.: US 6,636,463 B2
(45) Date of Patent: Oct. 21, 2003

(54) METHOD AND APPARATUS FOR COMPENSATING DATA IN REPRODUCING OPTICAL DISK

(75) Inventors: Young-sig Kwon, Gyeonggi-do (KR); Hyck-jin Lee, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 259 days.

(21) Appl. No.: 09/903,518

(22) Filed: Jul. 13, 2001

(65) Prior Publication Data

US 2002/0093887 A1 Jul. 18, 2002

(30) Foreign Application Priority Data

Jan. 5, 2001 (KR) ............................................. 2001-678

(51) Int. Cl.[7] .......................... G11B 21/08; G11B 20/18
(52) U.S. Cl. ................................ 369/30.23; 369/53.16
(58) Field of Search ........................ 369/30.23, 30.11, 369/30.18, 30.27, 53.12, 53.13, 53.15, 53.16, 53.17, 53.18; 711/202

(56) References Cited

U.S. PATENT DOCUMENTS

| 5,130,969 A | * | 7/1992 | Sako ............................ 369/58 |
| 5,202,876 A | * | 4/1993 | Takagi et al. ................. 369/58 |
| 5,235,585 A | * | 8/1993 | Bish et al. .................... 369/54 |
| 5,319,627 A | * | 6/1994 | Shinno et al. ................. 369/54 |
| 5,502,701 A | * | 3/1996 | Kudo et al. ................... 369/54 |
| 5,541,903 A | * | 7/1996 | Funahashi et al. ............ 369/54 |
| 5,883,867 A | * | 3/1999 | Yamamuro ..................... 369/54 |
| 6,160,778 A | * | 12/2000 | Ito et al. ...................... 369/54 |
| 6,463,021 B2 | * | 10/2002 | Nakane et al. ............ 369/53.15 |
| 6,469,978 B1 | * | 10/2002 | Ohata et al. ............. 369/275.3 |

FOREIGN PATENT DOCUMENTS

| JP | 63-74173 A | * | 4/1988 | ............. 369/30.23 |
| JP | 10-208399 A | * | 8/1998 | ............. 369/30.23 |
| KR | P1994-0016168 | | 7/1994 | |

* cited by examiner

*Primary Examiner*—Tan Dinh
(74) *Attorney, Agent, or Firm*—Robert E. Bushnell, Esq.

(57) ABSTRACT

A data compensating method and apparatus for compensating a block from which data cannot be read due to the presence of a scratch or dust when reproducing an optical disk are provided. The data compensating method includes the steps of: (a) setting a first block region for storing a block of data currently being reproduced and a second block region for storing the previous block of data, and reproducing the disk according to a read command; (b) determining the type of data block from a header in a sought block when the number of seek operations is greater than a predetermined value in reproducing the disk in step (a); (c) substituting an address of a block of data in the second block region, corresponding to a data block determined in step (b), for an address requested by a host; and (d) transmitting to the host the block of data in the second block region substituted in step (c).

18 Claims, 3 Drawing Sheets

METHOD AND APPARATUS FOR COMPENSATING DATA IN REPRODUCING OPTICAL DISK

CLAIM OF PRIORITY

This application makes reference to, incorporates the same herein, and claims all benefits accruing under 35 U.S.C. §119 from my application METHOD FOR COMPENSATING DATA FOR OPTICAL DISC AND APPARATUS THEREOF filed with the Korean Industrial Property Office on Jan. 5, 2001 and there duly assigned Ser. No. 678/2001.

BACKGROUND OF THE INVENTION

1. Technical Field

The present invention relates to a system for recording and reproducing an optical disk and, more particularly, to a data compensating method and apparatus for compensating a block from which data cannot be read in reproducing the optical disk due to the presence of scratches.

2. Related Art

In general, a host interfaces with various peripheral devices such as hard disk drives, mouses, and CD-ROM drives to access MPEG (Moving Picture Experts Group) data. When the host requests the transmission of a particular piece of data, a pickup seeks a disk to find an address of the desired data. Then, MPEG data reproduced by the pickup undergoes signal processing, such as decoding, and is buffered in order to transmit the data to the host. Conventionally, pauses may occur in an apparatus for reproducing a disk recorded according to the MPEG standards due to the presence of scratches or foreign material on a particular block. When a pause occurs, the reproducing apparatus continues to retry read operations at the same position on the disk. In this case, since the host allocates a large amount of memory to the reading of data encoded onto an optical disk, other programs are difficult to run. In the worst scenario, the host may not read the MPEG data from the disk.

SUMMARY OF THE INVENTION

To solve the above problems, it is a first object of the present invention to provide a method of compensating data using an extra block region if a scratch or dust exists on an optical disk.

It is a second object of the present invention to provide an optical disk reproducing apparatus for compensating data using an extra block region if a scratch or dust exists on a disk.

In order to achieve the first object, the present invention provides a method of compensating data recorded on a disk including the steps of: (a) setting a first block region for storing a block of data currently being reproduced and a second block region for storing the previous block of data, and reproducing the disk according to a read command; (b) determining the type of a data block from a header in a sought block if the number of seek operations is greater than a predetermined value in reproducing the disk in step (a); (c) substituting an address of a block of data in the second block region, corresponding to a data block determined in step (b), for an address requested by a host; and (d) transmitting to the host the block of data in the second block region substituted in step (c).

In order to achieve the second object, the present invention provides an optical disk reproducing apparatus for compensating data recorded on a disk. The apparatus includes: a buffer having a first region for storing a block of data currently being reproduced and a second region for storing the previous block of data; a signal processor that digitizes an input signal, stores a block of data in the buffer, and demultiplexes the block of data; and a controller that determines the type of data from a header in the block of data demultiplexed by the signal processor, substitutes an address of the second region, in which the previous block of data is stored, for an address requested by a host if the number of seek operations exceeds a predetermined reference value, and transmits the block of data corresponding to the substituted address to the host.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
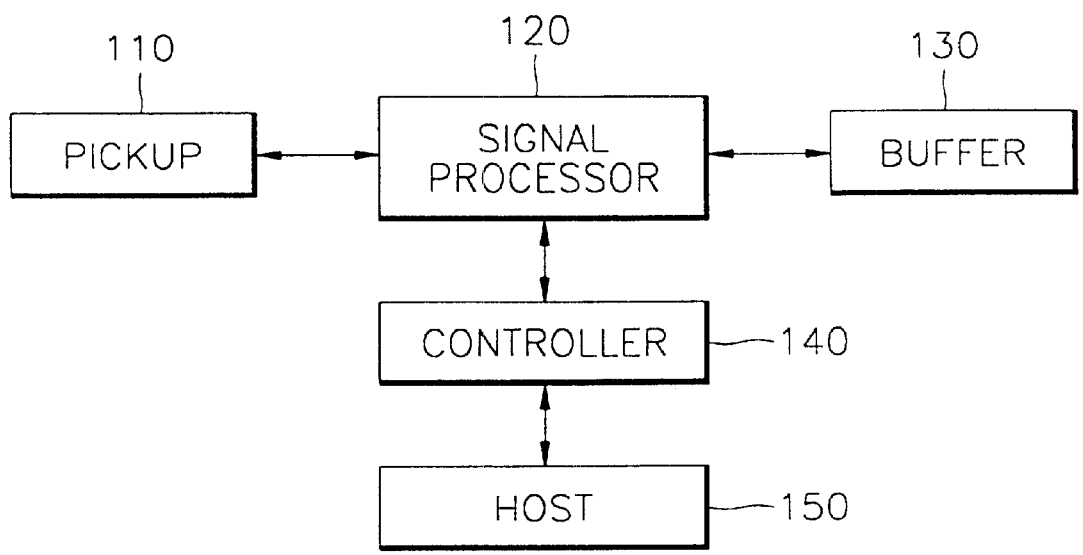
FIG. 1 is a system block diagram of a data compensating apparatus according to the present invention.

Referring to FIG. 1, a host 150 transmits a data access command to a controller 140, receives MPEG data from a signal processor 120, and exchanges a protocol with the controller 140.

If a read command for data recorded on a disk is issued by the host 150, a pickup 110 is controlled by the controller 140 and the signal processor 120 to detect a radio frequency (RF) signal from a disk (not shown). The signal processor 120 digitizes the RF signal received from the pickup 110, stores a block of data in a buffer 130, performs error detection and error correction on the block of data, and demultiplexes the block of data into audio, video, and message blocks.

The buffer 130 provides a data block region and an extra block region to store blocks of audio data, video data, and message data decoded by the signal processor 120. The controller 140 identifies audio, video, and message blocks from a sub header in the block of data demultiplexed by the signal processor 120, monitors the block of data processed by the signal processor 120, and stores the current block of data and the previous block of data in the data block region and the extra block region of the buffer 130, respectively, depending on the type of data. Also, if the number of seek operations on a particular block is greater than a predetermined reference value when reproducing the disk, the controller 140 determines that an error occurs in the block and replaces an address requested by the host 150 with an address of the extra block region in which the previous block of data is stored.

Figure 2A:
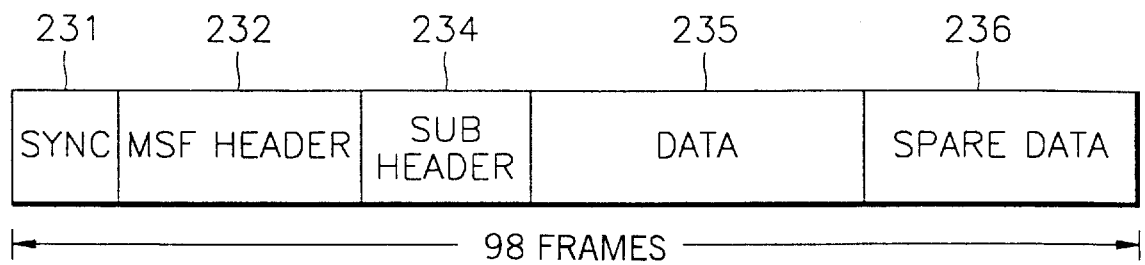
FIG. 2A shows a data format of a block in an optical disk.

FIG. 2A shows a data format of a block (or sector) in an optical disk, such as a CD-ROM. Referring to FIG. 2A, one block consists of 98 frames, that is, synchronization (SYNC) 231, a minute second frame (MSF) header 232, a sub header 234, data 235, and spare data 236. Information about the type of data blocks, such as audio, video and message blocks, is recorded in the sub header 234.

Figure 2B:
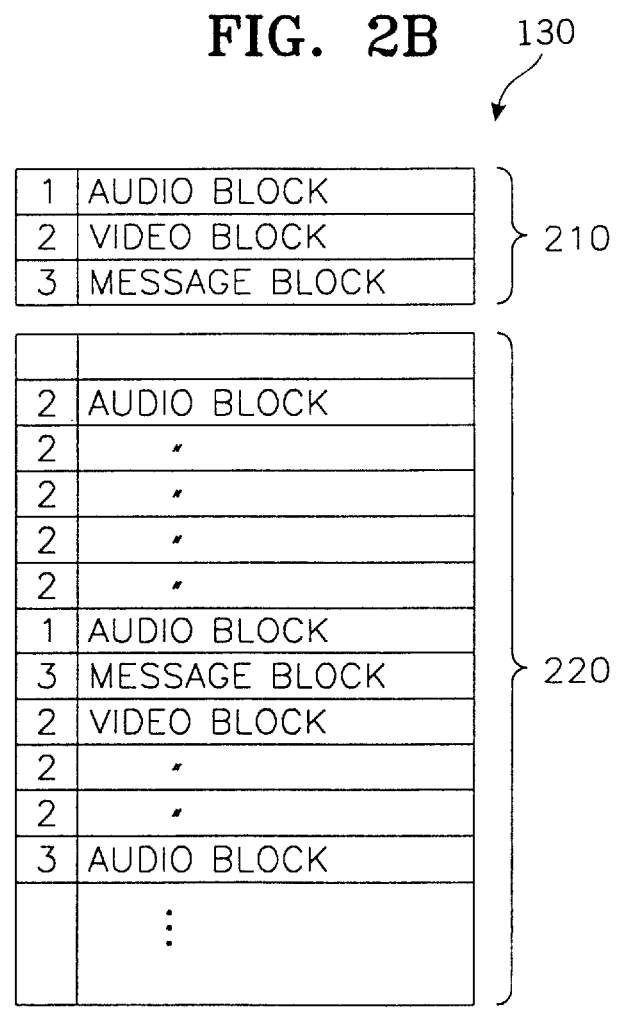
FIG. 2B shows the structure of a buffer for buffering blocks of data reproduced on a disk.

FIG. 2B shows the structure of the buffer 130 for buffering blocks of data reproduced on a disk. The buffer 130 is divided into an extra block region 210 and a data region 220. Audio data, video data and message data, which are currently reproduced, are stored in the data block region 220 in units of blocks. The previous data blocks, that is, video data, audio data and message data, are stored in the extra block region 210.

Figure 3:
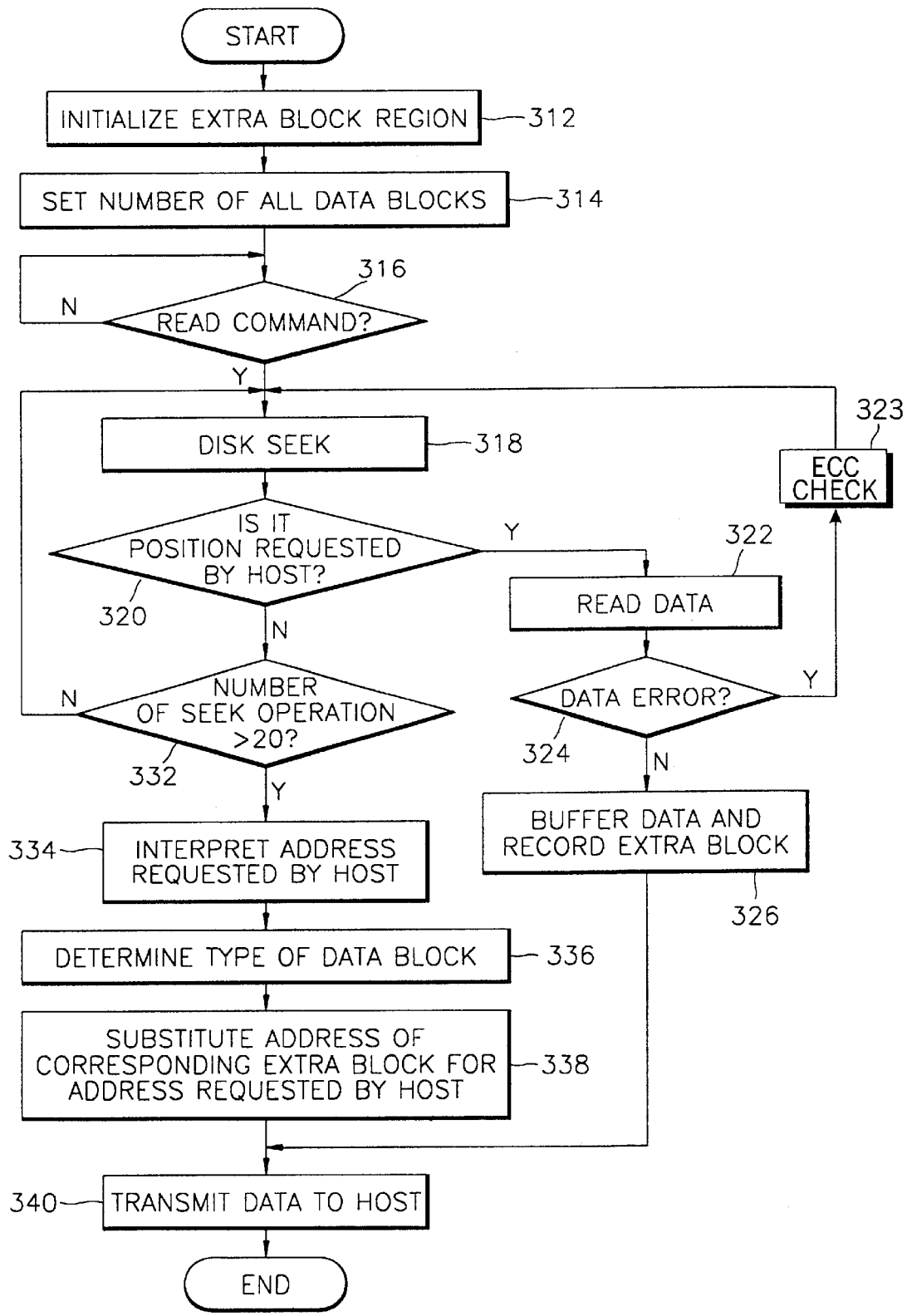
FIG. 3 is a flowchart of a method for compensating data in the controller of FIG. 1 according to the present invention.

FIG. 3 is a flowchart showing a data compensating method according to the present invention. First, after the extra block region 210 and the data region 220 are set in the buffer 130, the extra block region 210 is initialized (step 312), and the number of all data blocks to be used is set (step 314). The extra block region 210 includes audio, video, and message blocks. Next, if a data read command is received from the host 150 (step 316), a disk seek starts (step 318); otherwise, a read command is awaited. After the disk seek operation is completed, it is determined whether or not a sought block is the position requested by the host 150 (step 320). If the block is the position requested by the host 150, data is read from the block (step 322) to determine whether a data error occurs (step 324). In this case, if a data error is not detected, the block of data is buffered in the data block region 220, the previous block of data is stored in the extra block region 210, and the block of data is transmitted to the host 150 (steps 326 and 340). If a data error is detected, a check is made using an error correction code (ECC) as to whether there is an error in SYNC, MSF header, and data (step 323). Then, a disk seek operation begins again (step 318).

Conversely, if the sought block is not determined to be the position requested by the host 150, a retry process continues until the number of seek operations exceeds a predetermined reference value, for example, 20 (step 332). If the number of seek operations exceeds the reference value, an address requested by the host 150 is interpreted (step 334).

Then, the type of data block is determined from the sub header 234 in a block on which a disk seek operation is performed (step 336). In this case, if any scratch or dust exists on the block, typically, only data is not read from the block. However, if a header in the sought block is not read either, the type of data block is determined from a header of the previous block.

Then, an address of a block within the extra block region 210, corresponding to the determined data block, is substituted for the address requested by the host 150 (step 338). For example, if the determined data block is an audio block, an address of an audio block in the extra block region 210 is substituted for the address requested by the host 150. If the determined data block is a video block, an address of a video data block in the extra block region 210 is substituted for the address requested by the host 150. If the determined data block is a message block, an address of a message data block in the extra block region 210 is substituted for the address requested by the host 150.

Then, the substituted block of data in the extra block region 210 is transmitted to the host 150 (step 340). Thus, if data is not read due to the presence of scratch or dust on a particular block, the address of the particular block is replaced with an address of an extra block in which the previous data is stored, thereby reading data in a stable manner.

As described above, according to the present invention, if any scratch or dust exists on a particular block in a disk, an address of the block is replaced with an address of an extra block in which the previous block of data is stored, thereby normally reading data without pauses and reducing the chances of, or eliminating, an overload of the host.

Although a preferred embodiment of the present invention has been described, it will be understood by those skilled in the art that the present invention should not be limited to the described preferred embodiment. Rather, various changes and modifications can be made within the spirit and scope of the present invention, as defined by the following claims.

What is claimed is:

1. A method of compensating data recorded on a disk, the method comprising the steps of:
   (a) setting a first block region for storing a block of data currently being reproduced and a second block region for storing a previous block of data, and reproducing the disk according to a read command;
   (b) determining a type of data block from a header of a sought block when a number of seek operations is greater than a predetermined value in reproducing the disk in step (a);
   (c) substituting an address of a block of data in the second block region, corresponding to a data block determined in step (b), for an address requested by a host; and
   (d) transmitting the block of data in the second block region, substituted in step (c), to the host.

2. The method of claim 1, further comprising the steps of reading data, buffering the data in the first block region, and recording the previous data in the second block region, when a position requested by the host is detected during a seek operation.

3. The method of claim 1, wherein step (b) comprises determining the type of data block from a header of the previous block of data when an error occurs in the header of the sought block.

4. The method of claim 1, wherein step (a) further comprises performing a disk seek operation in response to the read command.

5. The method of claim 4, wherein step (a) further comprises determining whether the sought block is a position requested by the host.

6. The method of claim 5, wherein step (a) further comprises determining whether the number of seek operations is greater than the predetermined value when the sought block is not the position requested by the host, and interpreting an address requested by the host when the number of seek operations is greater than the predetermined value.

7. The method of claim 5, wherein step (a) further comprises reading data and checking for data error when the sought block is the position requested by the host.

8. The method of claim 7, wherein step (a) further comprises performing an error correction code check and performing the seek operation when it is determined that there is a data error, and buffering data, recording an extra block, and performing step (d) when it is determined that there is not a data error.

9. An apparatus for compensating data recorded on a disk, said apparatus comprising:
   a buffer having a first region for storing a block of data currently being reproduced, and a second region for storing a previous block of data;
   a signal processor for digitizing an input signal, for storing the block of data in the buffer, and for demultiplexing the block of data; and
   a controller for determining the type of data from a header in the block of data demultiplexed by the signal processor, for substituting an address of the second region, in which the previous block of data is stored, for an address requested by a host when a number of seek operations exceeds a predetermined reference value, and for transmitting a block of data corresponding to the substituted address to the host.

10. A method of compensating data recorded on a disk, the method comprising the steps of:

(a) defining a first block region for storing a block of data currently being reproduced and a second block region for storing a previous block of data;

(b) performing a disk seek operation in response to a read command;

(c) determining a type of data block from a header of a sought block when a number of seek operations is greater than a predetermined value in reproducing the disk in step (a);

(d) substituting an address of a block of data in the second block region, corresponding to a data block determined in step (c), for an address requested by a host; and (e) transmitting the block of data in the second block region, substituted in step (d), to the host.

11. The method of claim 10, further comprising the steps of reading data, buffering the data in the first block region, and recording the previous data in the second block region, when a position requested by the host is detected during the seek operation performed in step (b).

12. The method of claim 10, wherein step (c) comprises determining the type of data block from a header of the previous block of data when an error occurs in the header of the sought block.

13. The method of claim 10, wherein step (b) further comprises determining whether the sought block is a position requested by the host.

14. The method of claim 13, wherein step (b) further comprises determining whether the number of seek operations is greater than the predetermined value when the sought block is not the position requested by the host.

15. The method of claim 14, wherein step (b) further comprises interpreting an address requested by the host when the number of seek operations is greater than the predetermined value.

16. The method of claim 13, wherein step (b) further comprises reading data and checking for data error when the sought block is the position requested by the host.

17. The method of claim 16, wherein step (b) further comprises performing an error correction code check and performing the seek operation when it is determined that there is a data error.

18. The method of claim 16, wherein step (b) further comprises buffering data, recording an extra block, and performing step (e) when it is determined that there is not a data error.

* * * * *